(12) United States Patent
Lee et al.

(10) Patent No.: US 10,645,560 B2
(45) Date of Patent: *May 5, 2020

(54) INTERCOM NETWORK, MOBILE TERMINAL, AND METHOD

(71) Applicant: RIEDEL Communications International GmbH, Wuppertal (DE)

(72) Inventors: Jiou-Pahn Lee, Wuppertal (DE); Thomas Riedel, Wuppertal (DE)

(73) Assignee: RIEDEL COMMUNICATIONS INTERNATIONAL GMBH, Wuppertal (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/364,234

(22) Filed: Mar. 26, 2019

(65) Prior Publication Data

US 2019/0222992 A1   Jul. 18, 2019

Related U.S. Application Data

(63) Continuation of application No. 15/813,663, filed on Nov. 15, 2017, now Pat. No. 10,285,034.

(30) Foreign Application Priority Data

Dec. 9, 2016  (DE) .................. 10 2016 123 966
Apr. 3, 2017  (DE) .................. 10 2017 107 148

(51) Int. Cl.
| | |
|---|---|
| *H04W 12/06* | (2009.01) |
| *H04B 5/00* | (2006.01) |
| *H04W 4/80* | (2018.01) |
| *H04L 29/06* | (2006.01) |
| *H04M 9/02* | (2006.01) |
| *H04W 12/08* | (2009.01) |

(Continued)

(52) U.S. Cl.
CPC ............ *H04W 4/80* (2018.02); *H04B 5/0031* (2013.01); *H04L 63/0492* (2013.01); *H04L 63/107* (2013.01); *H04M 1/00* (2013.01); *H04M 9/02* (2013.01); *H04W 12/06* (2013.01); *H04W 12/08* (2013.01); *H04L 63/0853* (2013.01); *H04M 1/727* (2013.01); *H04M 2250/04* (2013.01); *H04W 88/02* (2013.01)

(58) Field of Classification Search
CPC ....... H04W 4/80; H04W 12/06; H04W 88/02; H04B 5/0031; H04B 5/0025; H04B 2203/545; H04B 10/0705; H04M 3/382
See application file for complete search history.

(56) References Cited

U.S. PATENT DOCUMENTS 10,285,034 B2 *  5/2019  Lee ..................... H04L 63/0492

* cited by examiner

*Primary Examiner* — Andrew Wendell
(74) *Attorney, Agent, or Firm* — Andrew Wilford

(57) ABSTRACT

An intercom network for real-time audio communication between users has a stationary element to which the users are connected, a mobile terminal that comprises an audio input and that can transmit audio signals wirelessly to the stationary element or to another user, and a device in the stationary element for user management, that administers the users connected to the stationary element, and that carries out an authorization check for logging the mobile terminal onto the stationary element. An NFC element is provided in the device on the stationary element, and an NFC counter-element is provided on the mobile terminal that can transmit authorization information to the NFC element when the mobile terminal approaches the stationary element.

13 Claims, 3 Drawing Sheets

(51) Int. Cl.
  *H04M 1/00* (2006.01)
  *H04M 1/727* (2006.01)
  *H04W 88/02* (2009.01)

INTERCOM NETWORK, MOBILE TERMINAL, AND METHOD

CROSS REFERENCE TO RELATED APPLICATIONS

This application is a continuation of copending application Ser. No. 15/813,926 filed 15 Nov. 2017 with a claim to the priorities of German patent application 10 2016 123 966.8 filed 9 Dec. 2016 and 10 2017 107 148.2 filed 3 Mar. 2017.

FIELD OF THE INVENTION

The invention relates in the first place to an intercom network for real-time audio communication between users and comprising at least one stationary element—a base—to which the users are connected and at least one mobile terminal—a belt pack or a mobile microphone that has an audio input. Audio signals can be transmitted wirelessly by the mobile terminal within the DECT frequency range to the stationary element or to another stationary user. The stationary element comprises a device for user management that administrates the users connected to the stationary element, and an authorization check is carried out by the device for logging the mobile terminal onto the stationary element.

BACKGROUND OF THE INVENTION

Such networks have been developed, marketed and used by the applicant for decades and are described for example in German patent applications DE 10 2014 011 963 [US 2016/0050505] and DE 10 2014 104 811 by the applicant. The applicant is one of the world's leading companies in the area of intercom networks.

The intercom network developed by the applicant under the name Acrobat and used for some time serves for real-time audio communication between users.

The users are for example stationary intercom communication stations, but also mobile intercom terminals. The intercom network of the prior art comprises one or more stationary elements. In the linguistic usage, the latter are also referred to as a base or aerial. The base provides a kind of switching center and can switch direct lines between the connected users. An aerial is understood to mean a further stationary element that likewise either takes over the tasks of a communication center and/or can serve as a transmitting unit and/or a receiving unit for DECT radio signals or quite generally for example for VHF, UHF, DECT signals, in particular with frequency bands 2.4 gigahertz, 5.2 gigahertz or 5.8 gigahertz and/or for connecting further stationary users.

One or more communication stations and/or one or more stationary terminals, such as for example cable-bound microphones or cable-bound headsets, can be connected to the base or the aerial.

The intercom networks of the known type also usually include one or more mobile terminals. Mobile terminals within the meaning of the patent application are understood to mean devices which can communicate wireless with one or more users of the intercom network. The DECT frequency band in particular is used for data transmission. Insofar as the DECT frequency band is specifically mentioned in this patent application, the person skilled in the art should understand this to be an exemplary embodiment of a multiplicity of possible frequency bands covered by the invention, such as for example VHF, UHF, DECT, for example in frequency ranges of 2.4 gigahertz, 5.2 gigahertz or 5.8 gigahertz. In this frequency band, audio signals can be transmitted wirelessly by the mobile terminal to the stationary element, i.e. for example to the base, or to the aerial.

The mobile terminal is formed either by a so-called belt pack, or by a mobile microphone. A mobile microphone is strictly speaking a handheld microphone device that can communicate wirelessly, in particular via a DECT radio standard.

A belt pack is a device fastened to an operator or to an item of clothing of an operator, which comprises connections for a cable with which the belt pack can be connected to the microphone or a headset.

The mobile microphone can also be a component part of a headset.

Both the microphone and the belt pack each comprise an audio input. In the case of the microphone, the microphone part itself is understood within the meaning of the invention to mean the audio input, into which an operator can directly speak audio information.

In the case of a belt pack, the connection plug or the connection socket is referred to as the audio input, via which audio signals can be transmitted by a microphone or headset to be connected by a cable or wireless (for example via Bluetooth) to the belt pack.

An intercom network of the generic type is used in particular for organized events and live events. Mention can be made here for example of a song contest, such as the Eurovision Song Contest, or a sports event, for example reporting on a Formula One race. The intercom network is used on site, during the event, and provides absolutely failsafe, switchable communication connections between users.

An intercom network is configured in advance, for example in the factory, for the organized event or live event. All the required devices are assembled, and a device for user management that administers all the users to be connected to the stationary element, is set up or configured such that it knows which users are allowed to be connected to the intercom network during the event and which ones are not. When the event is being planned, it is possible to this extent to establish precisely what number of users with what functions, but in particular also what devices, are permitted to be connected to the intercom network.

The device for user management can be programmed as part of the configuration process, in particular such that it is ascertained and stored as to which specific mobile terminal is permitted to be or should be connected to the intercom network during the event.

The individual devices of the duly pre-configured intercom network are then sent to the venue of the event and set up on site.

The mobile terminals are usually allocated to operators, for example reporters, moderators or presenters.

In order that the operator with the mobile terminal can log on to the intercom network so as to be able to participate in the exchange of audio information, the inputting of a password or a PIN is required with the intercom network of the prior art. For this purpose, the mobile terminal is brought into the transmission/reception range of the stationary user of the intercom network, and a communication connection is then established between the mobile terminal and the stationary terminal via the radio connection via which the audio communication also takes place, i.e. in particular via a radio connection within the DECT frequency range. In the course of this communication exchange, the password, i.e. the identification, manually inputted by the operator on the mobile terminal is transmitted to the stationary element. The device for user management can now carry out an authorization check. If the password agrees with the password stored on a memory of this device, the mobile terminal is accepted for communication, otherwise declined.

As is customary with live events, a number of unexpected problems may arise shortly before the event. The inputting of the passwords requires a great deal of special attention, wherein the persons involved in these live events often also have to focus their attention and their concentration on numerous other aspects.

OBJECT OF THE INVENTION

Proceeding from the intercom network of the type described at the outset, the object of the invention is to develop the network in such a way that its operation becomes more reliable and more convenient.

SUMMARY OF THE INVENTION

The invention attains this object in that the device comprises an NFC element arranged on the stationary element, and an NFC counter-element is provided on the mobile terminal, authorization information being transmitted by the NFC counter-element to the NFC element when the mobile terminal approaches the stationary element.

The principle of the invention thus essentially consists in the fact that, instead of the manual inputting of a password required with an intercom network of the prior art so that the authorization check can be carried out, an NFC communication is now provided. For this purpose, an NFC element is arranged on the stationary element, and an NFC counter-element on the mobile terminal. NFC technology (NFC=Near Field Communication) is subject to known industry standards.

When the mobile terminal approaches the stationary element, authorization information can be transmitted according to the invention by the NFC counter-element to the NFC element.

The approach may require short distances of for example 0 to 10 cm between the two devices.

In an example of embodiment of the invention, the logging-on procedure is always initiated when a mobile terminal is brought into the vicinity of the stationary element—at least for a short time.

Authorization information that contains for example information concerning a device identification of the mobile terminal, or concerning an identification number or an identification of the mobile terminal, can be transmitted automatically by the NFC counter-element to the NFC element. Within the meaning of the invention, authorization information is regarded as any information or data which make it possible for the device for user management to carry out a check as to whether the respective mobile terminal is allowed to participate in the communication with the users of this intercom network. The device for user management is able to establish in the course of an authorization check whether the transmitted authorization information corresponds to the information which has previously been stored in a memory of the device.

Manual inputting of a password or a PIN or suchlike on the mobile terminal is to this extent no longer required. Transmission of the authorization information can take place automatically.

In this regard, the burden of inputting a password is removed from the operator. In particular, the operator no longer needs to note down a password. Valuable time and concentration is thus gained for the operator; the operation of the intercom network has become more reliable and more convenient.

A configuration of the intercom network is carried out such that, in the course of compiling the users of the intercom network participating at the event, all the devices are covered by the device for user management that will subsequently be used during the event. Provision can in particular be made such that each user has a unique identification or identification number or ID or suchlike and that the latter is allocated to him.

In the course of the transmission of authorization information by the NFC counter-element to the NFC element, this identification or device information can be transmitted to the device during a logging-on procedure on site, i.e. during or shortly before the event. A transmission of this access data can take place encrypted or, if appropriate, also unencrypted.

The intercom network according to the invention serves for real-time audio communication between users. The users can include stationary terminals or mobile terminals. A stationary terminal is understood to mean for example a communication station or a headset or a belt pack or a microphone that in each case is connected with the aid of a fixed, cable-bound connection to a stationary element, for example a switching center or a base or an aerial.

The intercom network according to the invention comprises at least one stationary or mobile element. It may for example be a base, i.e. a kind of switching center. The intercom network can however also comprise a plurality of stationary or mobile elements, for example a base and a plurality of so-called aerials connected thereto, which can operate for example in the manner of repeaters or in the manner of communication centers connected in parallel or in series.

All users are connected to the stationary element directly, or indirectly via other stationary elements.

The intercom network can include at least one mobile terminal, preferably a multiplicity of mobile terminals. Audio signals can be transmitted wirelessly with the respective mobile terminal to the stationary element, or alternatively also to another stationary user, or also to another mobile user. A transmission of the signals takes place wireless, in particular within the DECT frequency range that is laid down according to international standards.

The mobile terminal can—as the name itself indicates—be moved and displaced relative to the stationary element. The invention also covers the situation when mobile terminals transmit audio signals to different stationary users of the intercom network at different times, usually dependent on different relative positions with respect to the stationary elements of the intercom network.

The stationary element comprises a device for user management that registers and manages the users connected to the stationary element. Such an administration or management of the connected users requires for example that the device knows—at all times—which user is connected to it via which cable connection or which wireless connection, how the communication routes run, how the latter can be switched etc. The device for user management can be set up centrally or decentralized. The entire intelligence of the device for user management can be arranged centrally on the stationary element or only a part of this intelligence, the latter especially when the device for user management is set up decentralized.

An authorization check is carried out by the device for the logging-on of the mobile terminal to the stationary element. Intercom networks are covered by the invention wherein the given mobile terminal can always necessarily only be logged on to a specific stationary element, even if a plurality of stationary elements are provided in the network. However, the invention also includes the situation when the intercom network comprises a plurality of stationary elements, and the mobile terminal can log on to any of the plurality of stationary elements.

According to the invention, the device comprises an NFC element arranged on the stationary element. In the case of a plurality of stationary elements, it can be covered by the invention that an NFC element is arranged on each stationary element, or alternatively an NFC element is arranged only on one stationary element.

According to the invention, an NFC counter-element is arranged on the mobile terminal. The designations NFC element and NFC counter-element are selected arbitrarily. As commercially available components, a distinction is usually made between an NFC reader and an NFC tag. There are also conventional NFC components which comprises both parts, i.e. both the reader and also the tag. According to a variant, an NFC reader is arranged on the device for user management and an NFC tag on the respective mobile terminal. The reverse embodiment is however also covered by the invention.

Authorization information can be transmitted by the NFC counter-element to the NFC element when the two devices are brought close to one another. Such an authorization information transmission can take place every time, i.e. automatically, when the mobile terminal is brought close to the stationary element. The situation is however also covered by the invention when, to initiate the transmission of authorization information by the NFC counter-element to the NFC element, the operation of a button or a switch or another actuating element on the mobile terminal and/or on the stationary element has to be carried out by the operator.

NFC is understood to be a conventional, internationally established radio standard. The use of NFC components enables recourse to be taken to conventional, commercially available components.

According to an advantageous embodiment of the invention, the authorization information comprises a unique identification of the mobile terminal or information concerning the mobile terminal. It may for example be a unique identification which the device for user management at the stationary element can recognize, so as to be able to identify the mobile terminal as unequivocally belonging to the intercom network. In particular, however, it may also be a unique device identification that is issued only once for each mobile terminal, for example a kind of serial number.

The authorization information can comprise the identification encrypted or unencrypted, indirectly or directly. It is important that the correct mobile terminal logs on to the stationary element and that other devices not authorised for logging on to the intercom network can also be recognized by the device as not authorised, and can be excluded from logging on.

According to a further advantageous embodiment of the invention, the device for user management, in the course of carrying out the authorization check, permits logging-on of the mobile terminal to the stationary element only if the unique identification is stored as an authorised identification in a memory of the device. In the course of the configuration process of the intercom network, the authorised mobile terminals and/or information concerning them is stored encrypted or unencrypted in a memory. The device for user management carries out an authorization check when a mobile terminal logs on to a stationary element or to a mobile element, and accepts only those mobile terminals whose unique identification is contained in the memory as authorised. In this respect, the device for user management carries out a corresponding comparison.

The mobile terminal, once logged on to the intercom network, advantageously remains there until such time as a logging-off procedure is carried out.

According to a further advantageous embodiment of the invention, a plurality of mobile terminals are provided with the intercom network according to the invention. In particular, provision can be made such that each of the mobile terminals comprises an NFC element. Each of the mobile terminals can moreover have its own identification that can be transmitted to the NFC counter-element, or at any rate can be sent via the NFC counter-element to the device for user management. The invention proves to be particularly advantageous with such intercom networks, since the logging-on and registration procedures can thus be kept as short and simple as possible even in the case of a multiplicity of operators each with their own mobile terminals, since each mobile terminal can log on to the network by briefly approaching a stationary element.

According to a further advantageous embodiment of the invention, a plurality of stationary elements are provided. The device for user management can comprise a plurality of NFC elements that are split up between the plurality of stationary elements. Each of the plurality of stationary elements can advantageously comprise an NFC element in each case. With this embodiment of the invention, it is arbitrary which of the stationary elements the mobile terminal logs on to.

Irrespective of which of the stationary elements the mobile terminal has logged on to, the device for user management can acquire the information via the accomplished logging-on. The device for user management is organized decentralized here, and can carry out authorization checks irrespective of which stationary terminal a mobile terminal is trying to log on to.

According to a further advantageous embodiment of the invention, by a relative approach of a first mobile terminal toward a second authorised mobile terminal, authorization information can be transmitted by the NFC counter-element of the second mobile terminal to the NFC counter-element of the first mobile terminal. This information is transmitted wirelessly to the user management by the NFC counter-element of the first mobile terminal.

With this embodiment of the invention, a belt pack as a mobile terminal, for example, can not only itself carry out logging on to a stationary element, but rather a second belt pack, i.e. a second mobile terminal, can carry out logging-on to this above terminal. Thus, if appropriate, a plurality of mobile terminals can also log on successively at a first mobile terminal, and the latter can transmit the authorization information to the user management. The logging-on and registration procedure in the case where a plurality of mobile terminals are being used thus also becomes considerably more reliable and simplified.

The device for the management of users does not activate corresponding audio channels for communication between the users for the given mobile terminals until an authorization process has led to a positive result.

According to a further advantageous embodiment of the invention, an actuating element is arranged on the mobile terminal, as a result of the actuation whereof logging-off of the mobile terminal from the intercom network can be brought about. For example, a simple key or button can be provided here that when actuated logs off the mobile terminal from the intercom network.

Such a logging-off procedure can advantageously be logged and/or secured by the device for the management of users, so that it is ensured that communications to the logged-off mobile terminal are not carried out inadvertently.

The problem of the invention consists in providing a mobile terminal whose reliability and handling in connection with the process of logging on to the intercom network of the generic type is simplified.

The invention solves this problem in that the mobile terminal has an NFC counter-element is provided that can transmit NFC counter-element authorization information to an NFC element arranged on the stationary element when the mobile terminal approaches the stationary element of the intercom network.

Another problem underlying the invention is to develop such a method, such as is known with a generic intercom network and has been described, in such a way that said method is simpler, more convenient and more reliable.

According to a further aspect, the invention relates to a method of the logging-on of a mobile terminal to a stationary element of an intercom network comprising the steps of:

providing of at least one stationary element provided with an NFC element, providing a device for user management with which the users connected to the stationary element can be administered, providing at least one mobile terminal on which an NFC counter-element is provided, configuring the intercom network by storing a unique identification of the mobile terminal in a memory of the device, and logging the mobile terminal onto the stationary element by bringing the mobile terminal close to the stationary element such that as a result of the approach, authorization information is transmitted by the NFC counter-element of the mobile terminal to the NFC element on the stationary element.

For the sake of clarification, it should be pointed out that the first four steps are carried out before the start of the live event or organized event that is due to take place, especially, but not exclusively, at another location from the event venue.

On the other hand, the fifth step of logging on the mobile terminal is carried out directly just before the start of the event or during the event, in particular at the event venue.

The principle of the invention once again consists in developing a known intercom network of the prior art, as described at the outset, in such a way that the network becomes more reliable and more convenient.

The invention solves this problem in that the device comprises an RFID element arranged on the stationary element, and that an RFID counter-element is arranged on the mobile terminal, wherein authorization information can be transmitted by the RFID counter-element to the RFID element when the mobile terminal approaches the stationary element.

Furthermore according to the invention, an RFID element and an RFID counter-element can be used instead of an NFC element and instead of an NFC counter-element.

Moreover, the present invention covers any combinations of the variants on the invention described above which are described only or also with respect to NFC technology. Within the scope of the invention, these features can also be used in respect of RFID elements and RFID counter-elements, and such applications are also covered by the invention.

The problem underlying the invention is to develop the method described at the outset in such a way that it is simplified, more convenient and more reliable.

According to a further aspect, the invention relates to a method comprising the steps of providing at least one stationary element that is provided with an RFID element, providing a device for user management and with which the users connected to the stationary element can be administered, providing of at least one mobile terminal provided with an RFID counter-element, configuring the intercom network by storing a unique identification of the mobile terminal in a memory of the device, logging the mobile terminal onto the stationary element by bringing the mobile terminal close to the stationary element such that, as a result of the approach, authorization information is transmitted by the RFID counter-element of the mobile terminal to the RFID element on the stationary element.

Further advantages of the invention emerge from the uncited sub-claims, and also on the basis of the following description of the embodiments represented in the figures.

SPECIFIC DESCRIPTION OF THE INVENTION

Figure 1:
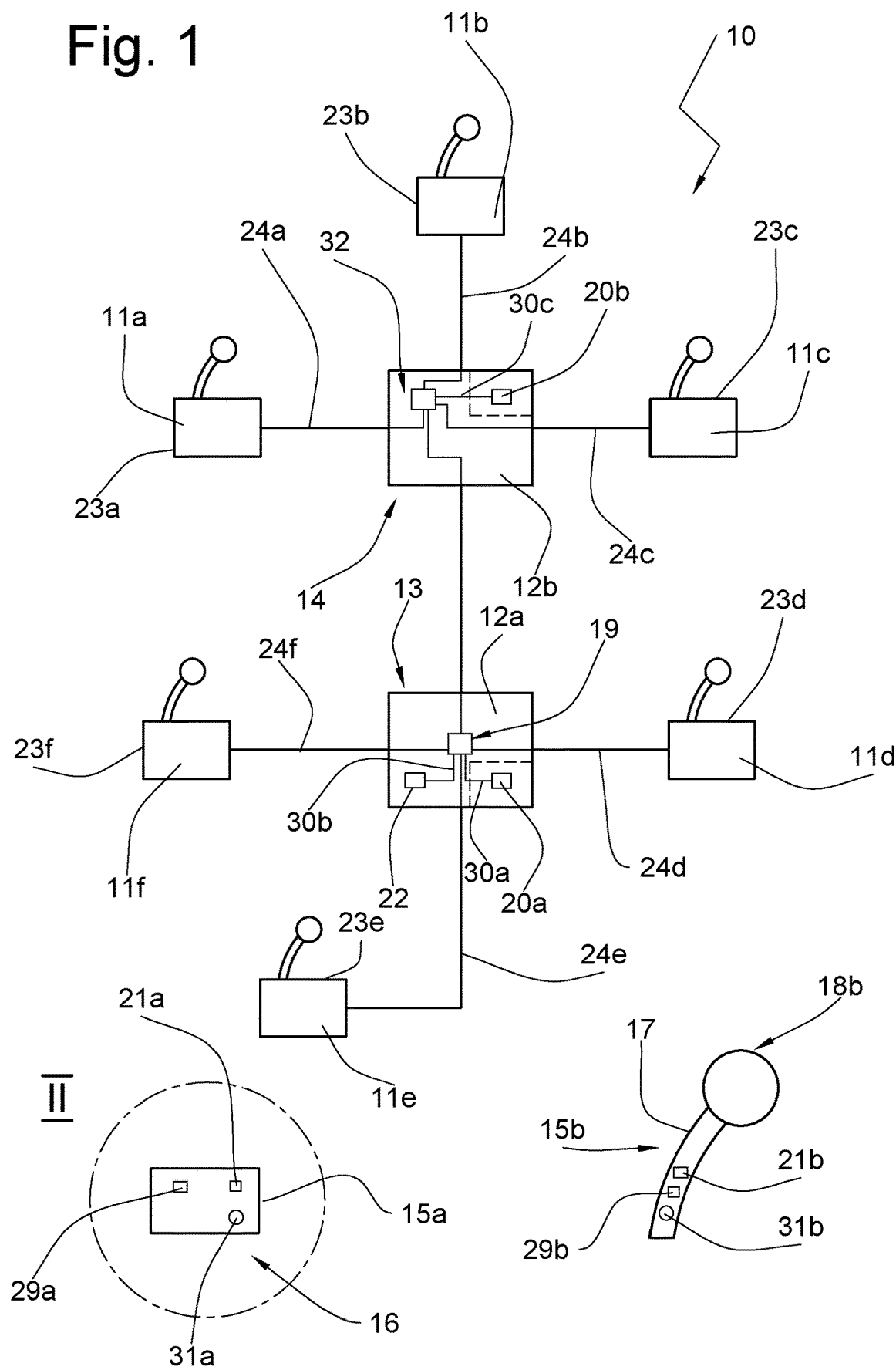
FIG. 1 shows in a diagrammatic view, in the form of a block diagram, an example of embodiment of an intercom network according to the invention with two stationary elements, six stationary users connected thereto, and two mobile terminals, also in a diagrammatic representation in the form of a block diagram.

Embodiments of the invention are described by way of example, in the following description of the figures, also making reference to the drawings. For the sake of a clear illustration—and also as far as different embodiments are concerned—identical or comparable parts or elements or regions are denoted by identical reference numbers, in some cases with the addition of lower-case letters.

Features which are described only in respect of one example of embodiment can, within the scope of the invention, also be provided with every other example of embodiment of the invention. Such amended embodiments—even if they are not represented in the drawings—are also covered by the invention.

All the disclosed features are in themselves essential to the invention. In the disclosure of the application, the disclosure content of the associated priority documents (copy of the prior application) and of the cited publications and of the described devices of the prior art are thus also included in their entire content, including for the purpose of also adopting individual or a plurality of features of these documents in one or in a plurality of claims of the present application.

An example of embodiment of the invention is represented diagrammatically in FIG. 1, and is denoted as a whole by 10 as an intercom network.

Intercom network 10 of FIG. 1 comprises a multiplicity of users that are denoted by reference numbers 11a, 11b, 11c, 11d, 11e, 11f. Intercom network 10, moreover, comprises a stationary element 12a that is constituted as a base, and a further stationary element 12b that is constituted as a so-called aerial.

Each of users 11a, 11b, 11c, 11d, 11e, 11f is constituted as a communication station 23a, 23b, 23c, 23d, 23e, 23f. Each communication station is a conventional electronic device that comprises in particular a microphone, a loudspeaker and direct-dial buttons. To avoid repetition, reference may be made to the applicant's German patent applications DE 10 2014 011 963 A1 and DE 10 2014 104 811 A1 with regard to the term communication station.

Each of communication stations 23a, 23b, 23c, 23d, 23e, 23f constitutes in this regard a stationary user 11a, 11b, 11c, 11d, 11e, 11f, who is connected in each case by an electrical connecting line 24a, 24b, 24c, 24d, 24e, 24f to at least one of two stationary elements 12a, 12b. As a result of the cable-bound connection between user 11a, 11b, 11c, 11d, 11e, 11f and stationary element 12a, 12b, corresponding user 11a, 11b, 11c, 11d, 11e, 11f is a stationary, i.e. non-mobile, user.

Not represented in FIG. 1, but covered by the invention, are also intercom networks wherein so-called belt packs or microphones are connected via a cable to a stationary element 12a, 12b. One then also speaks of stationary users.

A base 13 is provided in intercom network 10 according to the example of embodiment of FIG. 1. This base comprises a device 19 for the management of connected users 11a, 11b, 11c, 11d, 11e, 11f. Device 19 for the management of users can be constituted by a microprocessor, or can include such a device.

In the example of embodiment of FIG. 1, an aerial 14 is also provided in addition to so-called base 13.

The invention also includes embodiments of networks 10, wherein no aerial 14 is provided, and also embodiments, wherein a plurality of aerials are provided. The more aerials 14 that are provided, or the more base elements 13 that are provided, the more pronounced the intelligence of the control unit can be, i.e. the intelligence of device 19 for user management can be constituted decentralized, distributed over a plurality of stationary elements 13, 14.

Device 19 for the user management administers and manages the switching routes between individual users 11a, 11b, 11c, 11d, 11e, 11f.

A mobile terminal 15a in the form of a belt pack 16 and a further mobile terminal 15b in the form of a mobile microphone 17 are provided as further users of intercom network 10 according to the example of embodiment of FIG. 1.

Mobile microphone 17 comprises an audio input 18b, into which speech signals can be directly inputted by an operator 33.

Figure 2:
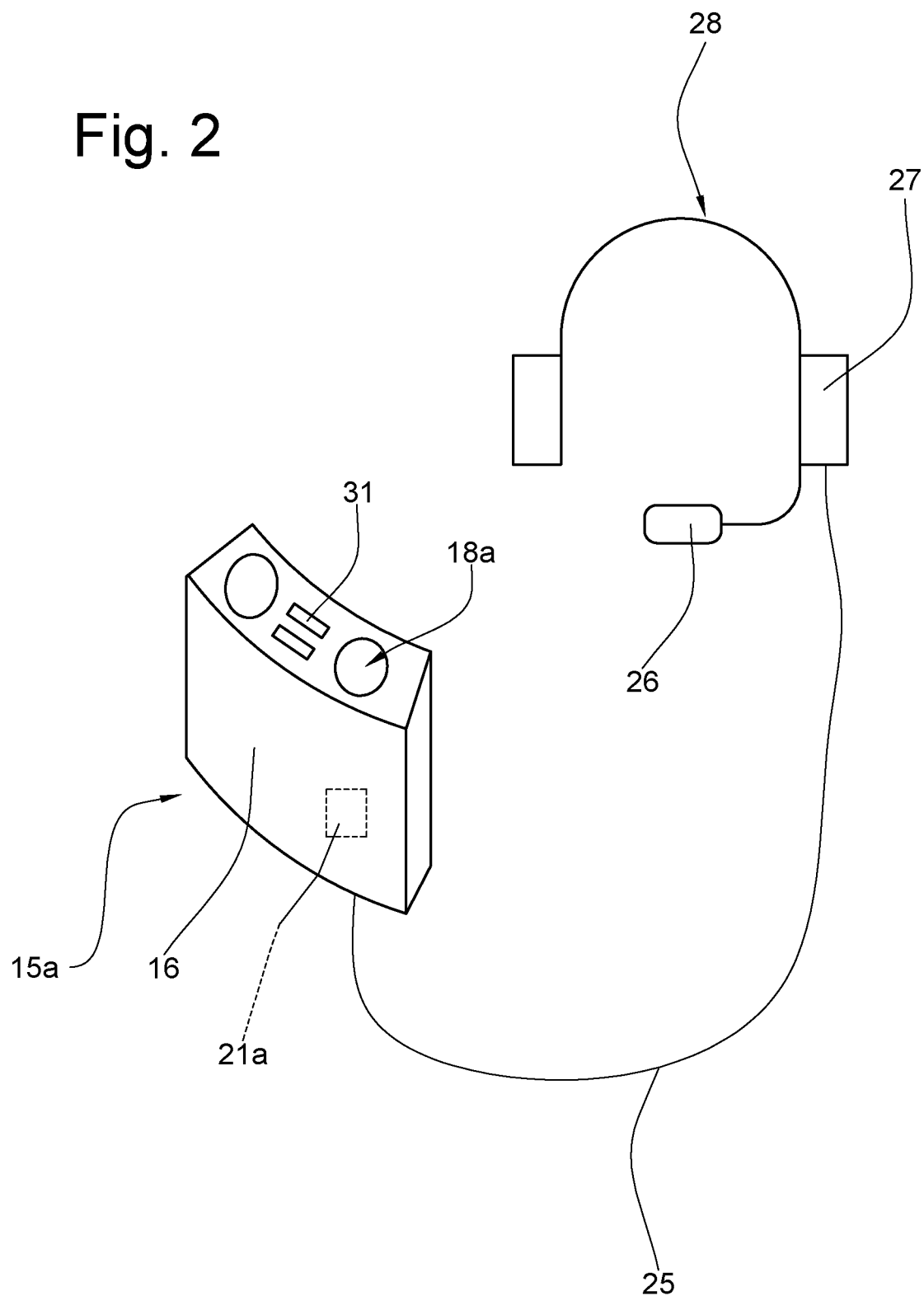
FIG. 2 shows in a diagrammatic perspective view a mobile terminal constituted as a belt pack, somewhat as shown in partial circle II in FIG. 1, with a headset connected thereto via cable.

Belt pack 16, on the other hand, comprises an audio input 18a which is constituted as an audio connection, for example as a socket or a plug, for receiving a cable 25 not represented in FIG. 2, for the connection to a microphone or to a headset 28 according to FIG. 2.

According to the example of embodiment of FIG. 1, a belt pack 16 and a mobile microphone 17 are provided in the example of embodiment of an intercom network 10. However, the invention also covers embodiments wherein a plurality of belt packs 16 and/or a plurality of mobile microphones 17 are provided. The invention also covers intercom networks where no stationary users 11a, 11b, 11c, 11d, 11e, 11f, but only mobile terminals 15a, 15b are provided.

Whereas audio signals are transmitted via cable-bound communication routes 24a, 24b, 24c, 24d, 24e, 24f via stationary users 11a, 11b, 11c, 11d, 11e, 11f, corresponding audio signals can be transmitted wirelessly from and to mobile terminals 15, 15b. For this purpose, recourse is taken in particular to the DECT radio standard.

Each of mobile terminals 15a, 15b comprises in this regard a communication module, with which audio signals can be received and sent. Likewise, base 13 and/or aerial 14 and/or stationary users 23a, 23b, 23c, 23d, 23e, 23f comprise corresponding communication modules, with which audio signals can be transmitted, i.e. received and sent, in particular according to radio standard DECT.

The respective communication modules for the audio signal transmission in mobile terminals 15a, 15b and in base 13 and/or aerial 14 are not represented in the figures for the sake of clarity. They are conventional, commercially available modules that are also already used in intercom networks of the prior art and in the corresponding mobile terminals.

Intercom network 10 according to the invention is usually, even if not exclusively, used at live events, at organized events, in the world of theater etc. In order to guarantee smooth running of the event, intercom network 10 is configured beforehand, for example in the factory. For this purpose, intercom network 10 is compiled with regard to the required devices or users. As far as the selection of mobile terminals 15a, 15b is concerned, it should be pointed out that each of the mobile terminals can comprise an electronic component 29a, 29b, in which an identification, in particular a device identification, or a device identification number or suchlike, is noted. The identification can for example be a serial number of the device, or at any rate a code that enables identification of the device by device 19 for user management.

For the sake of clarification, it should be mentioned that components 29a, 29b can also be combined with the respective NFC counter-element 21, 21b to be explained later, or can be a component part of the latter.

Those mobile terminals 15a, 15b which are to be connected to intercom network 10 according to FIG. 1 during the event are taken into account in the configuration beforehand, i.e. ex-works for example. For this purpose, device 19 for user management is informed, as part of the configuration process of intercom network 10, in particular by means of configurations software, that a specific mobile terminal 15a, for example belt pack 16 of FIG. 1, with a specific identification is to be accepted for logging on during the event. A memory is assigned to device 19 for user management, in which memory this identification is stored.

It should be pointed out that a configuration of intercom network 10 can be carried out for example sometime before the event, for example even several weeks or months before the event, since a great deal of time is often required to transport the individual devices of intercom network 10 to the event venue.

Once intercom network 10 of FIG. 1 has been set up on site, i.e. at the event venue, for the purpose of performing the event, and is put into operation, mobile terminals 15a, 15b to be used in intercom network 10 have to be logged on to or registered with the system. On the one hand, it is thus possible to prevent unauthorized devices from gaining access. On the other hand, it can be ensured that the correct devices, i.e. for example mobile terminals 15a, 15b, which also provide the required technical properties, are connected to intercom network 10.

Moreover, it can thus be ensured that, in the case where two or more intercom systems are used during the event, the correct mobile terminal 15a, 15b is logged on to the correct intercom system 10, and not inadvertently to the wrong intercom system 10.

In order to design this registration process so as to be as reliable and convenient as possible, an NFC element 20a is connected via a control line 30a to device 19 for user management at base 13. NFC element 20a can be constituted for example by a conventional NFC reader, such as is commercially available.

Mobile terminal 15a in the form of belt pack 16 in FIG. 1 comprises an NFC counter-element 21a. If NFC element 20a and NFC counter-element 21a are brought close to one another, for example to a distance of less than 10 cm from one another, the identification stored for example in memory 29a or in NFC counter-element 21a can be transmitted by NFC counter-element 21a to NFC element 20a, and from there transmitted onward to device 19 for user management. The latter checks the received data, compares the latter with data filed in memory 22, and can then decide by comparing them whether belt pack 16 or mobile terminal 15a of FIG. 1 is authorised for connection to stationary element 12a or not. Only in the case where a positive authorization check results can mobile terminal 15a participate in the communication with other users 23a, 23b, 23c, 23d, 23e, 23f of intercom network 10.

It should be noted that memory 22, according to FIG. 1, is connected via a control line 30b to device 19. Memory 22 can of course also be a component part of device 19.

NFC element 30a can also be a component part of device 19.

Memory 29a of mobile terminal 15a can likewise be a component part of the NFC counter-element. Suitable electronic units and elements and circuits can be used here.

Needless to say, it is pointed out that mobile terminal 15a, 15b has a voltage supply, for example via a battery or a rechargeable battery or suchlike, so that, insofar as required, the electronic and electrical elements and components of mobile terminal 15a, 15b can be supplied with the required operating voltage.

Stationary element 12a, 12b is likewise provided with a voltage supply (not represented), a line or a mains cable, so as to provide for the operation of electronic and electrical components of stationary element 12a.

Aerial 14 has a comparable structure. Here, a component 32 is provided that can be regarded as part of device 19 of stationary element 12a. Component 32 is connected via a control line 30c to a further NFC element 20b. In this example of embodiment, mobile terminal 15a can for example log on to stationary element 12a or alternatively also to stationary element 12b.

Figure 3:
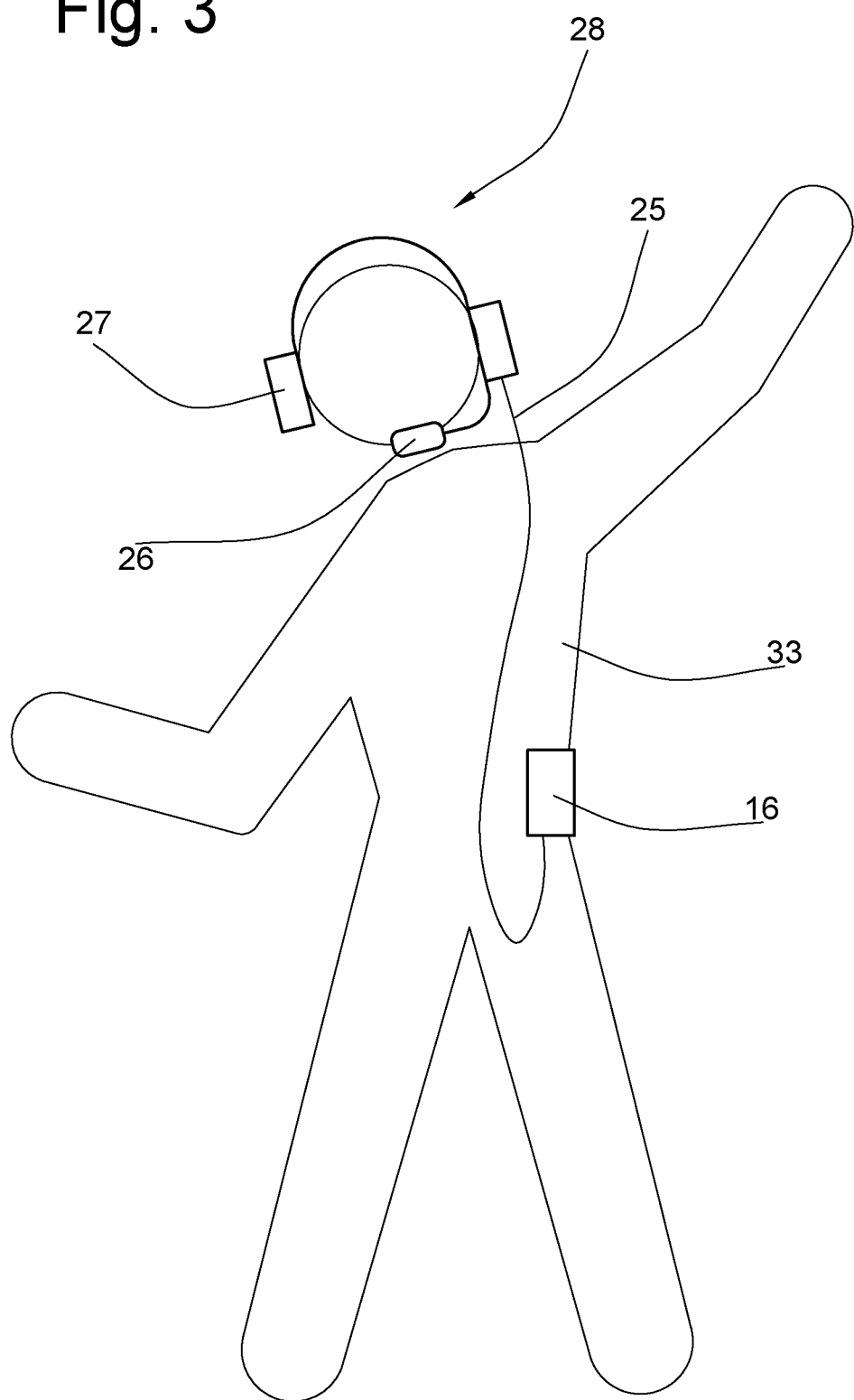
FIG. 3 shows in a diagrammatic representation an operator who is carrying such a belt pack and a headset, as shown in FIG. 2.

According to the example of embodiment of FIG. 2, it should be pointed out that a belt pack 16 can be connected via a cable 25 to a headset 28, and—as shown in FIG. 3—can be carried on a person's body. Headset 28 can comprise a microphone 26 and headphones 27. Other embodiments than those represented in FIGS. 2 and 3 are of course also covered by the invention. Person 33 according to FIG. 3 is to be understood only as an example, and can for example illustrate a moderator of a television transmission.

An actuating element 31a in the form of a button, a switch or a knob is fitted to mobile terminal 15a, 16. By actuation of actuating element 31a, logging-off of this mobile terminal 15a from intercom network 10 can take place. For example, by actuation of actuating element 31a, it can be communicated to device 19 via NFC counter-element 21a and NFC element 20a that this mobile terminal 15a is logging off from intercom network 10.

A second mobile terminal is represented in FIG. 1 in the form of mobile microphone 17.

Here too, an electronic component 29a is indicated, in which an identification of this microphone 17 can be stored. NFC counter-element 21b functions in the same way as NFC counter-element 21a described above.

Mobile microphone 17 according to FIG. 1 also comprises an actuating element 31b, with which logging-off of the mobile microphone from intercom network 10 can be carried out.

We claim:

1. An intercom network for real-time audio communication between users, the network comprising:
    a stationary element to which the users are connected;
    a mobile terminal that has an audio input and that can transmit audio signals wirelessly to the stationary element or to another user;
    a device in the stationary element for user management, that administrates the users connected to the stationary element, and that carries out an authorization check for logging the mobile terminal onto the stationary element;
    an NFC element in the device on the stationary element; and
    an NFC counter-element on the mobile terminal that can transmit authorization information to the NFC element when the mobile terminal approaches the stationary element.

2. The intercom network according to claim 1, wherein the authorization information comprises a unique identification of the mobile terminal.

3. The intercom network according to claim 2, wherein the device, in the course of carrying out the authorization check, permits logging the mobile terminal onto the stationary element only if the unique identification is stored as authorized identification in a memory of the device.

4. The intercom network according to claim 1, wherein a plurality of mobile terminals are provided.

5. The intercom network according to claim 4, wherein the mobile terminals each comprise a respective NFC counter-element with its own identification.

6. The intercom network according to claim 1, wherein a plurality of stationary elements is provided and the devices each comprise a NFC element for each of the stationary elements.

7. The intercom network according to claim 4, wherein, by a relative approach of a first mobile terminal toward a second mobile terminal, authorization information can be transmitted by the NFC counter-element of a second mobile terminal to the NFC counter-element of the first mobile terminal and from there onward to the NFC element of the stationary element.

8. The intercom network according to claim 1, further comprising:
    an actuating element on the mobile terminal that when actuated logs the mobile terminal out of the intercom network.

9. A mobile terminal for use in an intercom network according to claim 1, wherein the NFC counter-element on the mobile terminal can transmit authorization information to the NFC element on the stationary element when the mobile terminal approaches the stationary element of the intercom network.

10. The network according to claim 1, wherein the mobile terminal has, separate from the respective NFC counter-element, a communication module for receiving and transmitting audio signals.

11. A method of logging a mobile terminal onto a stationary element of an intercom network having users that can transmit audio signals wirelessly to conduct real-time audio communication, the method comprising the following steps:

providing a stationary element provided with an NFC element, providing a device for user management and with which the users connected to the stationary element can be administered, providing a mobile terminal on which an NFC counter-element is provided, configuring the intercom network by storing a unique identification of the mobile terminal in a memory of the device, and logging the mobile terminal onto the stationary element by bringing the mobile terminal close to the stationary element such that, as a result of the approach, authorization information is transmitted by the NFC counter-element of the mobile terminal to the NFC element on the stationary element.

12. The method defined in claim 11, further comprising the step of:

receiving or transmitting the audio signals between the mobile terminal and the stationary element or any other user via a communication module in the mobile terminal, the communication module being separate from the respective NFC counter-element.

13. An intercom network for real-time audio communication between users, the network comprising:

a stationary element to which the users are connected;

a mobile terminal that comprises an audio input and that can transmit audio signals wirelessly with the mobile terminal to the stationary element or to another user;

a device in the stationary element for user management that administers the users connected to the stationary element and that carries out an authorization check by the device for logging the mobile terminal onto the stationary element;

an RFID element in the device on the stationary element; and an RFID counter-element on the mobile terminal for transmitting authorization information by the RFID counter-element to the RFID element when the mobile terminal approaches the stationary element.

\* \* \* \* \*